Figure 1:
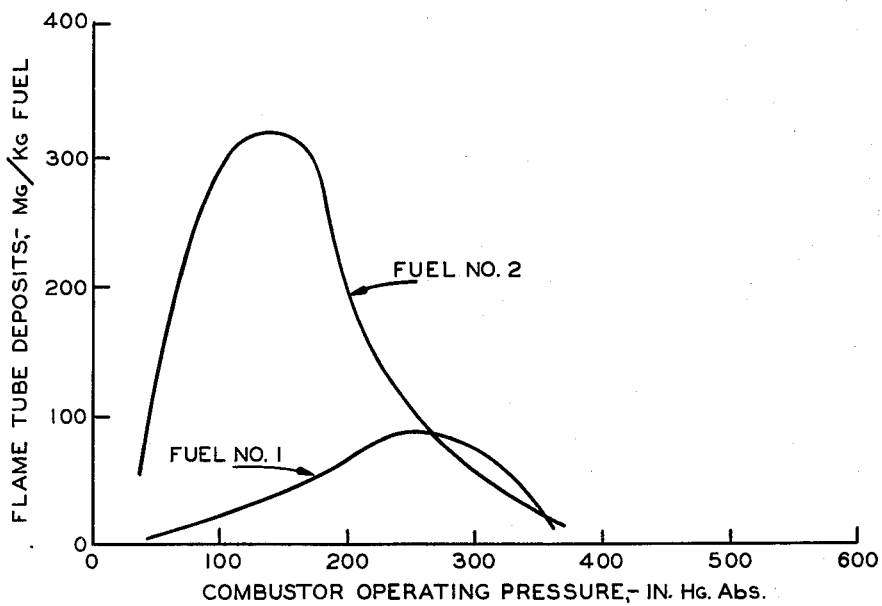

Aug. 2, 1960

G. D. KITTREDGE 2,947,138

METHOD OF OPERATING CONTINUOUS
COMBUSTION TYPE POWER PLANTS

Filed March 29, 1956

INVENTOR.
G. D. KITTREDGE

BY Hudson and Young

ATTORNEYS

United States Patent Office 2,947,138
Patented Aug. 2, 1960

2,947,138

METHOD OF OPERATING CONTINUOUS COMBUSTION TYPE POWER PLANTS

George D. Kittredge, Bartlesville, Okla., assignor to Phillips Petroleum Company, a corporation of Delaware Filed Mar. 29, 1956, Ser. No. 574,696

8 Claims. (Cl. 60—35.4)

This invention relates to a method of operating continuous combustion type power plants. In one aspect, this invention relates to a method of operating continuous combustion gas turbine power plants. In another aspect, this invention relates to a method of operating continuous combustion power plants with a minimum of carbon deposition.

Continuous combustion type power plants can be divided broadly into three groups: aerodynamic, i.e., jet engines; surface vehicles, e.g., railroad engines, automobiles, and marine engines; and stationary power plants. Jet engines can be classified into three categories, i.e., ram jets, turbo-jets, and pulse jets.

It is a common impression, and broadly speaking it is correct, that jet engines can be operated on a wide variety of fuels; however, the fact still remains that the fuel used can and does affect engine performance. One criterion by which a jet engine fuel may be judged is its tendency to cause deposition of resinous and/or carbonaceous material on either the flame tube and other vital parts of the combustion chamber or the turbine in a turbo-jet engine. The deposition of resinous and/or carbonaceous material in the combustion chamber of a jet engine is undesirable because the deposition of such carbonaceous material may either cause the formation of hot spots on the surface of the flame tube, and its quickened subsequent failure, or disturb the air flow, or fuel flow in the combustion system and thereby reduce the combustion efficiency of the engine. Further, and possibly most important in turbo-jet engines, pieces of the resinous and/or carbonaceous material are sometimes dislodged from the surface in the combustion chamber and blown into the blades of the high speed turbine to cause mechanical damage to the turbine.

A great number of hydrocarbon fuels containing varying amounts of paraffins, naphthenes and aromatics have either been proposed or used in gas turbine engines, especially jet engines. It is well known that fuels of higher boiling point have greater heating value per gallon than aviation gasoline and also that aromatic type fuels have greater heating value per gallon than either paraffinic or naphthenic fuels. At the present time, many jet-powered aircraft are volume-limited rather than weight-limited insofar as fuel capacity is concerned. Therefore, the heat content of the fuel per unit volume is very important in the operation of turbojets. On the basis of increasing the range of aircraft, it would be advantageous to have engines designed to utilize aromatic type fuels with higher boiling points, if possible. However, the aromatic-containing fuels that have been employed in most of the present day jet engines have given some smoke and considerable objectionable deposits, thereby making these fuels undesirable for universal usage.

I have found that fuels having a high aromatic content can be employed in a continuous combustion power plant without excessive deposition of resinous and/or carbonaceous material in the combustor, or on other vital engine parts of said power plant, by operating the combustor at pressures above about 250 inches of mercury absolute, more preferably above about 270 inches of mercury absolute. I have found that fuels containing at least about 20 percent aromatic hydrocarbons are unexpectedly as good as paraffinic hydrocarbon fuels when operating the combustor at a pressure of about 250 inches of mercury or higher. I have also found that aromatic type fuels show very desirable combustion characteristics with regard to both combustion stability and combustion efficiency when the combustor is operated at pressures above about 250 inches of mercury. In addition, I have also found that the flame tube metal loss was actually lower with a highly aromatic fuel than with an isoparaffinic fuel at these high combustor pressures.

Thus, broadly speaking, this invention resides in a method of operating a continuous combustion type power plant, which method comprises supplying a fuel of high aromatic content to the combustor of said power plant and operating said combustor at a pressure in excess of about 250 inches of mercury absolute.

An object of this invention is to provide an improved method for operating continuous combustion power plants. Another object of this invention is to provide an improved method for operating continuous combustion gas turbine power plants. Another object of this invention is to provide an improved method for operating jet engine power plants. Still another object of this invention is to provide a method of operating a continuous combustion power plant whereby fuels of high aromatic content can be used without excessive deposition of carbon in the flame tube of the combustor, or other vital parts, of said power plant. Yet another object of this invention is to provide an improved method of operating continuous combustion power plants whereby metal losses in the flame tube of the combustor of said power plant are reduced. Other aspects, objects, and advantages of the invention will be apparent to those skilled in the art upon study of the accompanying disclosure.

Thus, according to the invention, there is provided a method of operating a continuous combustion type power plant, which method comprises: supplying a hydrocarbon stock fuel containing at least 20 percent by volume of aromatic hydrocarbons to the combustor of said power plant; burning said fuel in said combustor; and operating said combustor at a pressure in excess of about 250 inches of mercury absolute.

Fuels which can be used in the present invention are the liquid hydrocarbon fractions containing at least 20 percent aromatic hydrocarbons. The invention is particularly adapted to, and is particularly advantageous with, fuels containing at least about 50 percent of aromatic hydrocarbons. Thus, a fuel having an aromatic hydrocarbon content of at least 50 percent by volume is a presently preferred fuel for use in the method of the invention.

The fuel can be either a wide boiling range fraction (JP-3 or JP-4) or kerosene type (JP-5) fuel containing at least 20 percent aromatics. The boiling range of these fuels will generally range from about 200 to about 600° F. for jet engine use. However, for stationary gas turbine installations, the upper end of the boiling range can be considerably higher since freezing point is not a critical factor. The aromatic components present in the fuel can be either low boiling or high boiling aromatics, or both. Aromatics such as benzene and toluene and/or substituted aromatics, such as cumene, can make up the 20 to 100 percent aromatic portion of the fuel volume.

The present invention is applicable to all continuous combustion type power plants, including stationary as well as jet engine power plants, operating with combustor pressures above about 250 inches mercury.

Continuous type jet engines in which the method disclosed herein can be employed include turbo-prop, turbo-jet, and ram jet engines, utilizing either a vaporizing or an atomizing type system for supplying the fuel to the combustion chamber.

The above-designated jet engine types may generally be operated by injecting a hydrocarbon fuel and air into the combustion zone of the jet engine at a fuel-air ratio between 0.005 and 0.10 and igniting the fuel so as to heat the air and combustion gases, thus increasing the volume of gas mass which is exhausted through the exhaust duct of the jet engine. Turbo-jet engines are preferably operated on an overall fuel-air ratio between 0.01 and 0.03. Ram jet and pulse jet engines are preferably operated at overall fuel-air ratios of from 0.03 to 0.07. In the operation of this invention, fuel and air are injected into the combustion zone of the engine at a fuel-air ratio between 0.005 and 0.10.

It is within the scope of this invention to operate a turbo-jet engine with the fuel described above and with the injection of oxygen. If oxygen or an oxygen-supplying compound, such as a peroxide, is used for the purpose of supplying oxygen rather than air, the fuel-air ratios would necessarily have to be adjusted accordingly so as to maintain a fuel-oxygen ratio equivalent to the fuel-air ratio disclosed herein.

When operating in accordance with this invention, air is usually supplied to the turbo-jet engine at an inlet air pressure of between about 250 and about 500 inches of mercury absolute and at a linear air velocity of from 30 to 200 feet per second. The preferred inlet air pressure is at least 250 inches of mercury absolute. While 500 inches of mercury has been set forth above as the usual upper limit on the air inlet pressure, it is within the scope of the invention to operate at higher pressures. Actually, the upper limit on air inlet pressure or combustor operating pressure is determined by materials of construction, engine design factors, and other operating variables. Currently, fuel is usually supplied to the combustor at a temperature ranging between −60° F. and 350° F. Air usually is supplied to the combustor at a temperature between −30° F. and 900° F. and more frequently at a temperature between 100° F. and 780° F. Higher pressures and the attendant higher temperatures can be used. When operating a turbo-jet engine within the above range of conditions, the aromatic fuel utilized in this invention burns within a combustion efficiency range of between 40 percent and 100 percent, and ordinarily within the range of from 85 percent to 100 percent.

A large number of test runs measuring carbon deposition and other characteristics of different types of fuels have been made with different designs of combustors, both vaporizing type ("walking-cane") and atomizing type. I have found there is a good correlation between carbon deposition and combustor operating pressure in test runs made with the different designs of combustors, i.e., in all cases the carbon deposits reach a peak at pressures of about 150 inches of mercury and thereafter decrease with increasing operating pressure. Therefore, the invention is not to be limited to any particular type of combustor.

In conducting the said test runs, the test procedure was as follows. The flame tube of the combustor was weighed to obtain an initial weight. The combustor was then assembled and operated for one-half hour periods at constant conditions, following which it was disassembled and the flame tube weighed, both before and after cleaning. From these determinations, the weight of deposits formed per unit weight of fuel burned was found along with the weight of metal lost per unit time.

In making the test runs specifically described hereinbelow in the examples, an atomizing type combustor was employed. The combustor employed comprises a perforated flame tube, closed at its upstream end, mounted within an outer shell. Fuel is injected into the flame tube through an atomizing nozzle positioned in the upstream end of said flame tube. Combustion air is supplied to the interior of the flame tube, through the perforations in the wall thereof, from the annular space between said flame tube and said outer shell.

The following examples will serve to further illustrate the invention:

EXAMPLE I

A first and second series of carbon deposition test runs were carried out in a 2-inch diameter fuel atomizing type combustor using a maximum quality, low volatility, JP-4 referee fuel containing no aromatics (fuel No. 1 in Table I) in said first series, and a minimum quality, low volatility, JP-4 fuel containing 21 percent by volume aromatics (fuel No. 2 in Table I) in said second series. Said test runs were carried out at combustor operating pressures ranging from 50 to 350 inches of mercury. Air flow rates and fuel flow rates were such as to maintain an overall fuel-to-air weight ratio of 0.015 in all test runs. The results of said test runs are shown graphically in Figure 1 of the drawings. The graph shows the effect of increasing operating pressure upon the amount of carbon deposited in the flame tube of the combustor for each series of test runs.

EXAMPLE II

A third and fourth series of carbon deposition test runs were carried out in a 2-inch diameter fuel atomizing type combustor substantially the same as that employed in Example I. In said third series of runs, a 77.1 percent isoparaffinic JP-5A fuel containing only 2.2 percent aromatics (fuel No. 3 in Table I) was used. In said fourth series of runs, a refined aromatic kerosene containing 88.3 percent aromatics (fuel No. 4 in Table I) was used as the fuel. Said test runs were carried out at combustor operating pressures ranging from about 60 to 450 inches of mercury. Air flow rates and fuel flow rates were such as to maintain an overall fuel-to-air weight ratio of 0.010 in all test runs. The results of said test runs are shown graphically in Figure 2 of the drawings. That graph shows the effect of increasing operating pressure upon the amount of carbon deposited in the flame tube of the combustor for each series of test runs.

A comparison of the results shown in Figure 1 shows that with both the maximum quality (fuel No. 1) and minimum quality (fuel No. 2) low volatility JP-4 test fuels, the flame tube deposits reached a peak at an operating pressure of about 150 inches of mercury, following which the carbon deposits decreased with increasing operating pressure. It is to be noted that the two curves practically merge at about 250 inches of mercury pressure. Thus, at about 250 inches pressures, and above, the minimum quality fuel (fuel No. 2) is unexpectedly as good as the maximum quality fuel (fuel No. 1). It will be remembered that fuel No. 2 contained 21 percent aromatics, whereas fuel No. 1 contained no aromatics.

Figure 2:
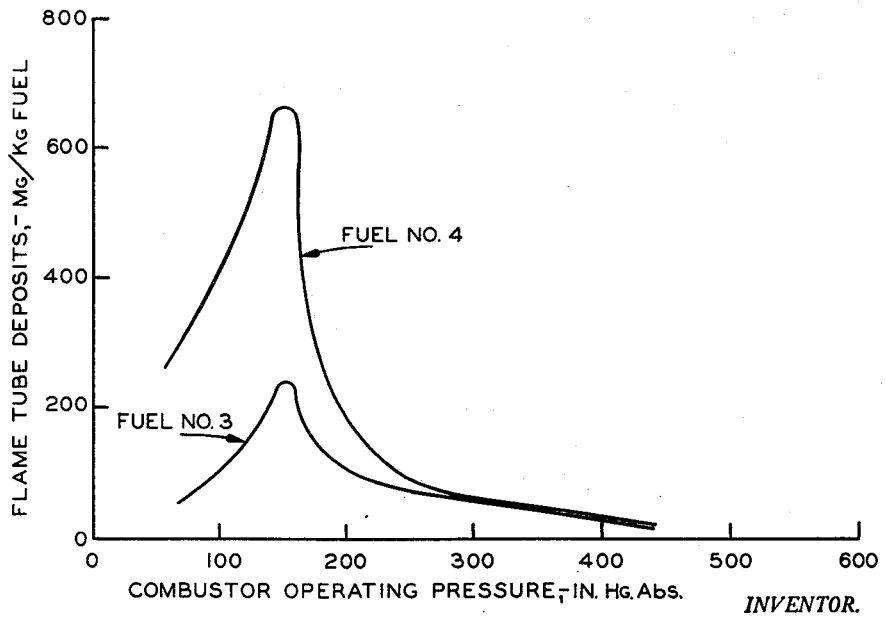

A comparison of the results shown in Figure 2 shows the same general type of curve was obtained, i.e., the flame tube deposits reached a peak at an operating pressure of about 150 inches of mercury pressure and then decreased with increased operating pressure. It is to be noted that at an operating pressure of about 250 inches pressure, the two curves practically merged as in Figure 1. Thus, at about 250 inches of mercury pressure, and above, fuel No. 4 containing 88.3 percent aromatics was unexpectedly as good as fuel No. 3, which contained only 2.2 percent aromatics.

Both fuel No. 1 and fuel No. 3 are specification quality fuels and the amount of carbon deposition obtained with each is tolerable throughout the entire range of operating pressures shown. While the two curves shown in each of Figures 1 and 2 are not completely merged at 250 inches of pressure, the differences between the two fuels is small in each figure and the amount of carbon deposition shown for fuels 2 and 4 at this pressure is well within tolerable limits. Therefore, my preferred operating pressure according to the method of the invention is about at least 250 inches of mercury absolute. Since the two curves in each figure are merged at about 270 inches of mercury pressure, a more preferred operating pressure, in some instances at least, is about 270 inches of mercury absolute.

As indicated above, I have observed that less flame tube metal loss is obtained when using high aromatic fuels and operating the combustor at pressures above about 250 inches of mercury absolute. This is an extremely important advantage, in addition to reduced carbon deposition, of my invention. As is well known to those skilled in the art, flame tube metal loss is directly related to combustor durability and the life of the engine. Therefore, the importance of this advantage of my invention will be readily appreciated by those skilled in the art. The following example illustrates this advantage of my invention.

EXAMPLE III

Two additional test runs were carried out in the same 2-inch diameter fuel atomizing type combustor as used in the above Example II. Fuel No. 3 (the isoparaffinic fuel) was used in one test run and fuel No. 4 (the high aromatic kerosene fuel) was used in the other test run. Operating conditions in both test runs were: combustor pressure, 450 inches of mercury absolute; inlet air temperature, 750° F.; linear air velocity, 100 feet per second; and overall fuel-to-air weight ratio, 0.010. The duration of both test runs was one-half hour. With fuel No. 3, the flame tube metal loss was 700 mg. per hour, and with fuel No. 4, the flame tube metal loss was only 440 mg. per hour. Carbon deposition was not measured in these runs because in one run some deposit was inadvertently knocked off before the flame tube could be weighed. However, deposition appeared to be very light and appeared to be about the same for both fuels.

Table I, given below, gives the chemical and physical properties of the fuels used in making the test runs of the above examples.

As mentioned above, it has been found that aromatic type fuels show very desirable combustion characteristics with regard to both combustion stability and combustion efficiency when used in a combustor operated at a pressure above about 250 inches of mercury. An investigation carried out using four pure hydrocarbon fuels (normal heptane, isooctane, benzene, and toluene) shows that both of the aromatic fuels rated higher with respect to the normal paraffin and the isoparaffinic fuel at combustor operating pressures in the range of 150 to 350 inches of mercury absolute. At all pressures, benzene was superior in combustion stability to the other test fuels. At 350 inches of mercury pressure, toluent exhibited combustion stability performance equivalent to that of normal heptane. As is well known to those skilled in the art, normal heptane is considered to be an excellent jet engine fuel. Thus, these data show that when hydrocarbon fuels of high aromatic content are used according to the method of the invention, i.e., operating the combustor at a pressure of at least about 250 inches of mercury, more preferably at least about 270 inches of mercury, not only are reduced carbon deposition and reduced flame tube metal losses obtained at pressures above about 250 inches of mercury, but also show that as the operating pressure is increased still further, other important operating advantages are obtained.

As will be evident to those skilled in the art, various modifications of the invention can be made in view of the foregoing disclosure. Such modifications are believed to be within the spirit and scope of this invention.

I claim:

1. A method of operating a continuous combustion type gas turbine power plant without excessive deposition of carbonaceous material in the combustor of said power plant, which method comprises: continuously supplying a normally liquid hydrocarbon fuel containing at least 50 percent by volume of aromatic hydrocarbons to said combustor; burning said fuel in said combustor; and operating said combustor at a pressure within the range of about 250 to about 500 inches of mercury.

2. The method of claim 1 wherein said combustor is operated at a pressure in excess of about 270 inches of mercury.

3. An improved method of operating a turbo-jet engine without excessive deposition of carbonaceous material in the combustor of said engine, which method comprises: continuously injecting into said combustor a normally liquid fuel consisting essentially of a hydrocarbon stock and containing at least 50 percent by volume of aromatic hydrocarbons, said fuel having a boiling range from about 200 to about 600° F., at a temperature ranging between —60° F. and 350° F.; passing air into an air compressor; injecting the resulting compressed air into Table I

INSPECTION PROPERTIES OF FUELS USED IN COMBUSTOR DEVELOPMENT TESTS

|  | Fuel No. 1 | Fuel No. 2 | Fuel No. 3 | Fuel No. 4 |
|---|---|---|---|---|
| API Gravity | 57.8 | 48.0 | 49.4 | 27.6. |
| Reid Vapor Pressure | 2.70 | 2.05 | | |
| ASTM Distillation: | | | | |
| IBP | 114 F | 124 F | 442 F | 368 F. |
| 10 | 208 | 227 | 447 | 373. |
| 20 | 269 | 284 | 449 | 375. |
| 50 | 385 | 388 | 457 | 378. |
| 70 | 425 | 421 | 464 | 381. |
| 90 | 480 | 472 | 480 | 387. |
| EP | 527 | 522 | 503 | 414. |
| Existent Gum—450 F. Steam Jet | 2.7 mgm./100 ml | 20.3 mgm./100 ml | 0.2 mgm./100 ml | 0.6 mgm./100 ml. |
| Potential Gum—16 hr., 450 F. Steam Jet | 10.4 mgm./100 ml | 23.8 mgm./100 ml | 2.6 mgm./100 ml | 0.8 mgm./100 ml. |
| Total Sulfur, wt. percent | 0.003 percent/wt | 0.071 percent/wt | 0.005 percent/wt | 0.006 percent/wt. |
| Freezing Point, ° F | <—80 | <—80 | <—40 | —23.44. |
| Corrosion [1] | Pass | Pass | Dark Tarn. 3 | Slight Tarn. 1. |
| Water Tolerance [2] | Pass | Pass | 1 | 1. |
| Bromine No | 3.0 | 3.5 | 2.4 | 2.5. |
| Aniline-Gravity Product | 10,745 | 7,066 | | |
| Paraffins+Naphthenes, vol. percent | 97.0 | 75.5 | 94.1 | 7.7. |
| Olefins, vol. percent | 3.0 | 3.5 | 3.7 | 4.0. |
| Aromatics, vol. percent | 0.0 | 21.0 | 2.2 | 88.3. |
| IP Smoke Point | 45 | 24 | 27 | 7. |
| Smoke Volatility Index | 67 | 46 | | |

[1] Corrosion—ASTM D130–50T.
[2] Water tolerance ratings—WADC proposed rating technique.

said combustor at a linear air velocity within the range of 30 to 200 ft./second, at a pressure within the range of 250 to 500 inches of mercury absolute, at a temperature between −30 and 900° F., and at a fuel-air ratio between 0.01 and 0.03; and burning said fuel in said combustor.

4. The method of claim 3 wherein said combustor is operated at a pressure in excess of about 270 inches of mercury.

5. The method of claim 1 wherein said fuel is benzene.

6. In the operation of a turbo jet engine, using a normally liquid hydrocarbon fuel boiling within the range of from about 200 to 600° F. and containing at least 50 percent by volume of aromatics, wherein: said fuel is continuously injected at a temperature within the range of −60° to 350° F. into the combustor of said engine; air, at a temperature within the range of −30 to 900° F., is injected into said combustor at a linear air velocity within the range of 30 to 200 ft. per second and at a fuel to air ratio between 0.01 and 0.03; and said fuel is burned with resulting excessive deposition of carbonaceous material, the improvement which comprises operating said combustor at a pressure within the range of 270 to 500 inches of mercury so as to avoid said excessive deposition of carbonaceous material.

7. In the operation of a turbojet engine, using a normally liquid hydrocarbon fuel boiling within the range of from about 200 to 600° F. and containing about 88 percent by volume of aromatics, wherein: said fuel is continuously injected at a temperature within the range of −60° to 350° F. into the combustor of said engine; air, at a temperature within the range of −30° to 900° F., is injected into said combustor at a linear air velocity within the range of 30 to 200 ft. per second and at a fuel to air ratio between 0.01 and 0.03; and said fuel is burned with resulting excessive deposition of carbonaceous material, the improvement which comprises operating said combustor at a pressure within the range of 270 to 500 inches of mercury so as to avoid said excessive deposition of carbonaceous material.

8. A method of operating a continuous combustion type gas turbine power plant without excessive deposition of carbonaceous material in the combustor of said power plant, which method comprises: continuously supplying a normally liquid hydrocarbo fuel boiling within the range of from about 200 to about 600° F. and containing at least 50% by volume of aromatic hydrocarbons to said combustor; burning said fuel in said combustor; and operating said combustor at a pressure within the range of about 250 to 500 inches of mercury so as to avoid said excessive deposit of carbonaceous material.

References Cited in the file of this patent

UNITED STATES PATENTS

| | | |
|---|---|---|
| 2,655,786 | Carr | Oct. 20, 1953 |
| 2,698,511 | Britton | Jan. 4, 1955 |
| 2,698,512 | Schirmer et al. | Jan. 4, 1955 |
| 2,698,513 | Britton et al. | Jan. 4, 1955 |
| 2,729,936 | Britton | Jan. 10, 1956 |